United States Patent [19]

Ireland

[11] Patent Number: 4,520,569

[45] Date of Patent: Jun. 4, 1985

[54] COMPONENT MEASURING INSTRUMENT

[75] Inventor: Eric Ireland, Letchworth, England

[73] Assignee: Sigma Ltd., England

[21] Appl. No.: 579,011

[22] Filed: Feb. 10, 1984

[30] Foreign Application Priority Data

Feb. 12, 1983 [GB] United Kingdom ................ 8303961

[51] Int. Cl.$^3$ .............................................. G01B 7/28
[52] U.S. Cl. ............................ 33/148 E; 33/148 H; 33/4.92; 33/179.5 A; 33/503; 33/561
[58] Field of Search .......... 33/174 L, 174 P, 179.5 R, 33/179.5 A, 179.5 D, 179.5 E, 148 H, 148 R, 148 E, 148 F, 147 N, 143 L, 149 R, 149 J

[56] References Cited

U.S. PATENT DOCUMENTS

| | | | |
|---|---|---|---|
| 3,805,393 | 4/1974 | Lemelson | 33/174 L |
| 3,905,119 | 9/1975 | Meyding | 33/174 L X |
| 4,107,848 | 8/1978 | Boehnlein | 33/174 L |
| 4,274,207 | 6/1981 | Flair | 33/179.5 R |

FOREIGN PATENT DOCUMENTS

186717 10/1966 U.S.S.R. ....................... 33/179.5 A

Primary Examiner—Harry N. Haroian

[57] ABSTRACT

A component measuring machine includes a base on which a carriage is mounted for movement along an x-axis. A compound slide structure is mounted on the carriage for moving a cradle along y- and z-axes. A support on the carriage and the cradle supports an arm so that it is angularly movable about a point relative to the carriage. Thickness measurements can be made by means of a caliper structure mounted on the end of the arm, which can be turned about its own longitudinal axis for varying the orientation of the caliper structure. The precise positions of the contact tips of the caliper structure are determined by accurately monitoring displacements of the carriage and the compound slide structure, and turning of the arm on its axis.

13 Claims, 12 Drawing Figures

COMPONENT MEASURING INSTRUMENT

This invention relates to a component measuring instrument intended primarily for accurately measuring the thickness and profiles of a component at a plurality of different positions.

A typical component for which an instrument of the invention is useful is a gas turbine engine compressor bladed disc. Such a disc has a plurality of blades each of airfoil section varying from hub to tip and it is important to check the blades by measuring the thickness thereof at each of several radially and chordally spaced positions. One known method of making such measurements involves using two spaced probes in a slide which can be moved successively to positions in which the locations of opposite sides of the blade can be measured. Such an arrangement requires, however, an extremely massive slide structure to enable sufficiently accurate sets of measurements to be made, since a large displacement of the probe-bearing slide is needed between measurement operations. Since the probe bearing slide needs to be long and rigid, the compound slide structure which supports it must also be massive to obtain a sufficiently rigid structure.

It is an object of the present invention to provide a relatively simple measuring instrument in which these difficulties are avoided.

A component measuring instrument in accordance with the invention comprises a base, a carriage mounted for movement on the base along a first axis, an arm mounted on said carriage for angular movement relative thereto about a point on the carriage, a cradle supporting the arm at a position spaced from said point, means supporting the cradle on the carriage for movement along second and third axes which are perpendicular to one another and to said first axis, whereby a free end of the arm is movable to any point on an imaginary part spherical surface with its centre at said point, first measuring means for measuring the position of the carriage relative to the base in the direction of the first axis, second and third measuring means for measuring the position of the cradle relative to the carriage in the direction of said second and third axes respectively, caliper means mounted on the free end of the arm and having a pair of contact tips which are urged together along predictable locii passing through and substantially normal to the centre line of said arm to a predetermined rest position relative to the arm, means for turning said caliper means about a fourth axis extending through said point and through said centre line of said arm, and fourth measuring means on the caliper means for measuring the position of each of said contact tips, whereby a measurement of a component can be made using said caliper means at any position within a range of positions determined by the ranges of movement of said carriage and said cradle.

Preferably the arm is supported on the carriage by means of a part spherical surface formed on the arm and resting on a three point support on the carriage. The cradle preferably comprises a pair of surfaces on which a further part spherical surface on the arm rests. The surfaces are preferably two cylinders mounted in spaced parallel relation parallel to the first axis on a compound slide structure which provides the facility for the cradle to be moved relative to the carriage along said second and third axes.

With such an arrangement, with the arm resting on two part spherical surfaces, angular movement of the caliper means about said fourth axis is preferably achieved by turning of the arm as a whole about the centres of the two spherical surfaces.

To avoid the necessity of employing a large, massive and cumbersome slide arrangement for supporting the carriage on the base, correction measurement means are preferably provided for measuring the actual position of carriage relative to the base in the direction of the second and third axes, so that appropriate corrections can be made to the measurements made by said second and third measuring means. Such correction measurement means preferably comprises a pair of bars mounted on the base so as to be accurately parallel with said first axis and a plurality of transducers on the carriage acting to measure the positions of different parts of the carriage relative to the these bars. A similar correction measurement arrangement may be provided for each of the slides of the compound slide structure which supports the cradle on the carriage.

In the above mentioned application of the instrument of the invention, a further problem arises, i.e. that of measuring the hub of the discs as well as the blade profiles. To enable the instrument to be used for such a measurement one contact tip of the caliper means is conveniently arranged to be swung to a non-operative position, and the other contact tip is mounted for linear movement in a direction parallel to said fourth axis as well as for angular movement as a caliper. A further measuring device is included in the caliper means to measure such linear movement.

An example of the invention is shown in the accompanying drawings in which.

Figure 1:
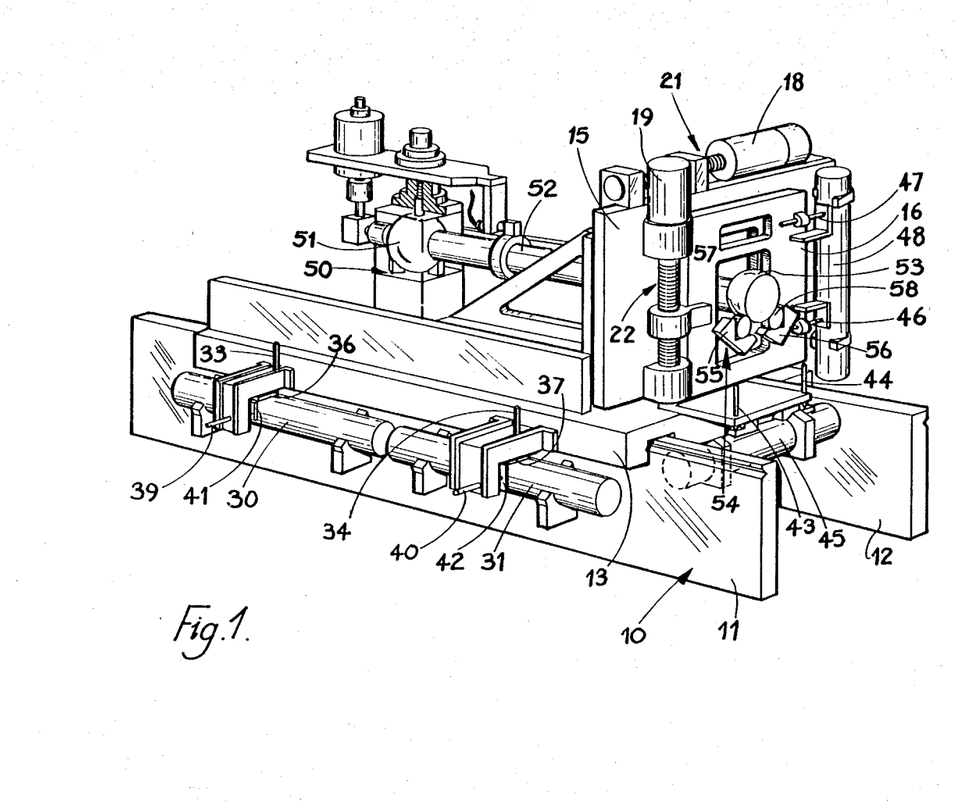
FIG. 1 is a diagrammatic perspective view of the instrument.
Figure 2:
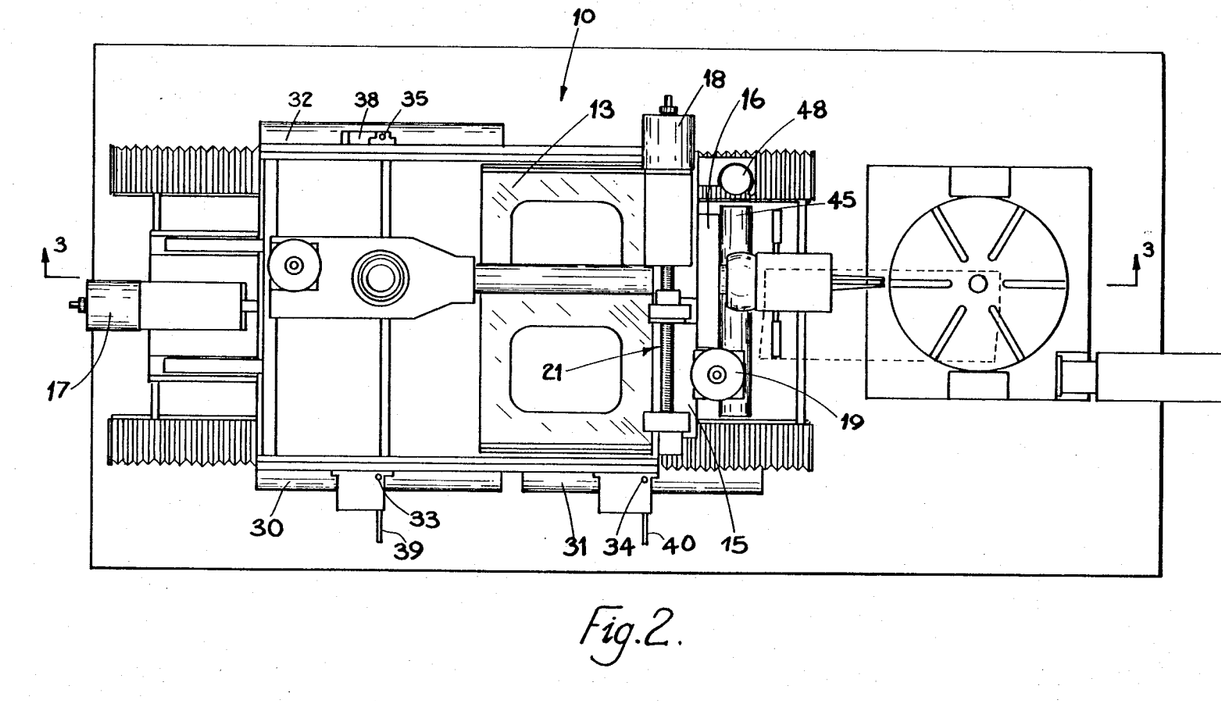
FIG. 2 is a plan view.
Figure 3:
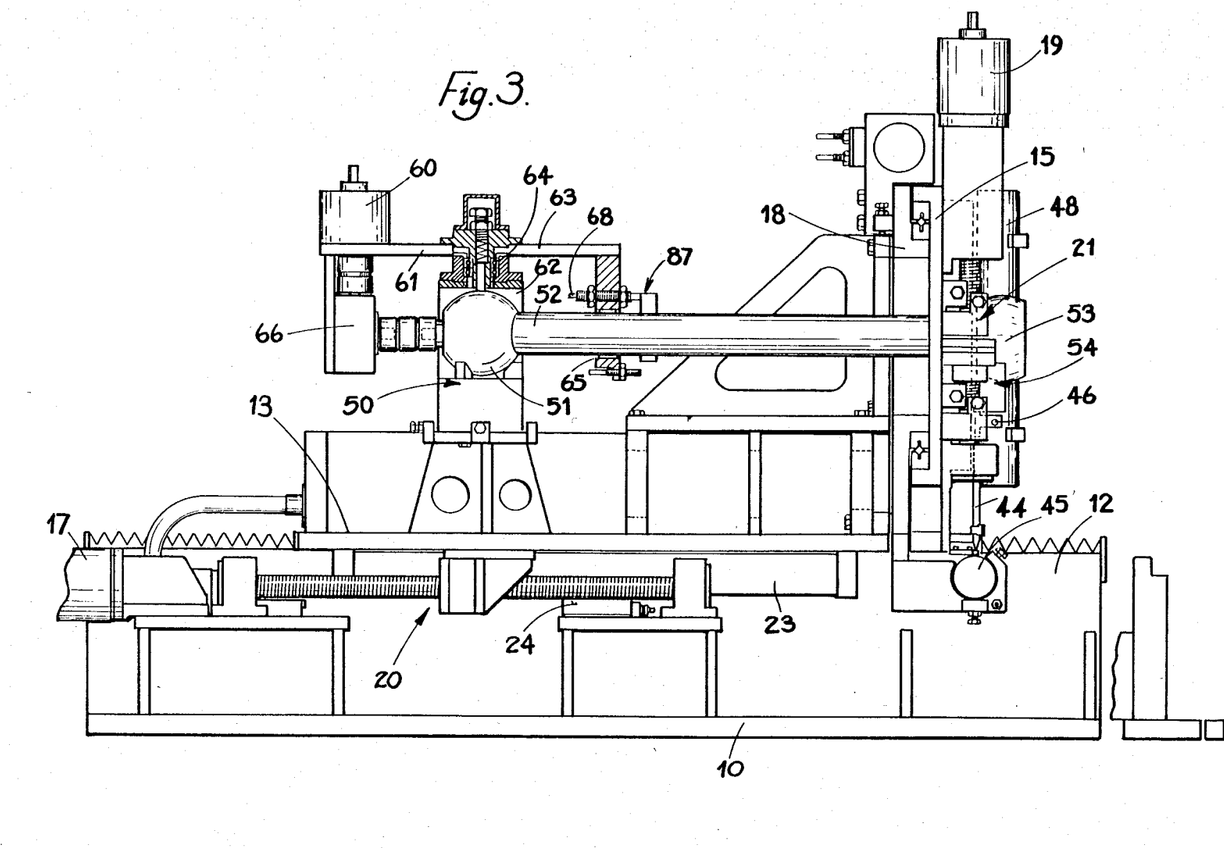
FIG. 3 is a diagrammatic section on line 3—3 in FIG. 2.

Referring firstly to FIGS. 1 to 3, the instrument has a base 10 with two rails, 11, 12 along which a generally horizontal X-axis carriage 13 is slidably movable. The carriage 13 is supported on the rails 11, 12 on simple linear roller bearings. At one end of the carriage there is mounted a slideway 14 for a horizontally movable Y-axis slide 15, which is again supported on single roller bearings. A vertical slideway is provided on the slide 15 on which a Z-axis slide 16 is mounted for vertical movement, again utilising simple roller bearings. The carriage 13, the slide 15 and the slide 16 are movable in mutually perpendicular X Y and Z axes by means of motors 17, 18, 19 respectively through the intermediary of suitable lead screw mechanisms 20, 21 and 22 respectively.

Figure 11:
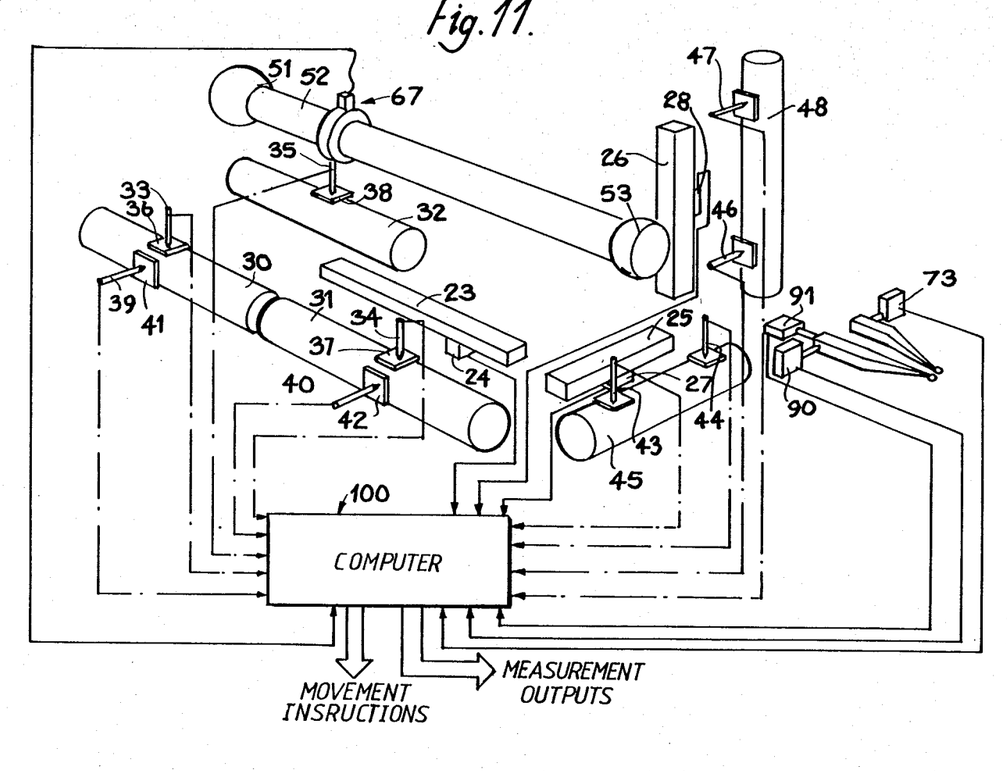
FIG. 11 is a diagram showing all the measuring devices in the instrument without the structure of the instrument.

Digital transducers are provided for measuring the displacement of the carriage 13 relative to the base, the slide 15 relative to the carriage 13, and the slide 16 relative to the slide 15. These transducers are shown diagrammatically in FIG. 11 as an elongated grating element 23 which is attached to carriage 13 and coacts with a reading head 24 on the base (see also FIG. 3), and similarly grating elements 25, 26 on the slides 15 and 16 respectively and coacting with reading heads 27, 28 respectively on the carriage 13 and the slide 15. These three displacement transducers measure the displacements of the carriage 13, and the slides 15 and 16 in the directions of the X-, Y- and Z-axes respectively.

However, since only simple roller bearings are used for supporting and guiding the carriage 13 and the slides 15 and 16, the transducers alone do not provide a sufficiently accurate indication of the position of the slide 16 relative to the base. To enable the accuracy to be improved to a satisfactory level, the position of each moving part is measured relative the part on which it moves in at least one direction transverse to the axis of such movement. In the case of the carriage 13, there are provided on one side of the base two aligned cylindrical bars 30, 31 and a second cylindrical bar 32 is provided at the other side of the base. These bars are accurately positioned so as to be truly parallel to the X-axis and an accurately known positions on the base. Three vertical position sensors 33, 34 and 35 are provided and these are mounted on the carriage 13 so as to detect the vertical displacement of the carriage in three positions. The sensors 33 and 34 are spaced in the direction of the X-axis and act vertically, through the intermediary of hinged pressure pads 36, 37 on the bars 30 and 31 respectively. Sensor 35 is spaced from the sensor 33 in the direction of the Y-axis and acts vertically on the bar through the intermediary of a hinged pressure pad 38. Furthermore, two more sensors 39 and 40 are mounted on the carriage 13 and act horizontally on bars 30 and 31 respectively through further hinged pressure pads 41 and 42. The sensors 33, 34 and 35 produce electrical signals which enable corrections to be made which compensate for bodily rise and fall of the carriage 13 as it moves along the base (i.e. linear displacement in the direction of the Z-axis) and for tilting of the carriage longitudinally (i.e. about the Y-axis) or laterally (i.e. about the X-axis). Similarly the sensors 39 and 40 provide electrical signals which enable corrections to be made to compensate for bodily movement of the carriage 13 in the direction of the Y-axis and for twisting of the carriage about the Z-axis.

For the slide 15 two vertical sensors 43, 44 on that slide act through appropriate pressure pads on a horizontal bar 45 on the carriage 13 parallel to the Y-axis. For the slide 16, two horizontal sensors 46 and 47 on the slide 16 act on a vertical (Z-axis) bar 48 on the slide 15. These sensors provide signals enabling corrections to be made to compensate for Z-axis shift of the slide 15 on the carriage 13, Y-axis shift of the slide 16 on the slide 15 and angular displacement, in both cases, about the X-axis. No account need be taken, as will be explained later, of X-axis shift of either slide.

Mounted on the carriage 13 is a three-point support device 50 for a part-spherical surface 51 on one end of an arm 52. the other end of the arm 52 is provided with another part spherical surface 53 which rests on a cradle 54 provided on the slide 16. This cradle 54 is made up of two V-blocks 55, 56 attached to the slide 16 and two cylindrical bearing elements 57, 58 carried by the V-blocks 55, 56 with their axes parallel to the X-axis and in a common horizontal plane. The part-spherical surface 53 rests on the surfaces of the cylindrical bearing elements. Since the position of the arm 52 in space is uniquely determined by the positions in space of the centres of the two spherical surfaces, 51 and 53, it will be seen that the positions of the slide 16 in the direction of the X-axis relative to the carriage is irrelevant, the distance between such centres being fixed and the spherical surface 53 being capable of sliding horizontally along the cylindrical bearing elements 57, 58.

Furthermore, since the arm 52 rests at its two ends on two spherical surfaces, it can be turned about its own axis (i.e. a line through the centres of the two spheres). For turning the arm on this axis there is provided a motor 60 mounted on a gymbal device 61 with its centre at the centre of the sphere 51. This device 61 includes a bracket 62 mounted on the carriage 13 to be angularly movable about a horizontal axis parallel to the Y-axis. A motor mount 63 is supported on this bracket on bearings 64, which are on axis perpendicular to the axis of the bracket 62 and the axis of the arm 52 and intersecting such axis at the centre of the sphere 51. A bearing 65 is mounted on the motor mount 63 to encircle the arm at a position intermediate the two spheres and this causes the motor mount to follow movements of the arm caused by displacements of the compound slide 15, 16. The motor 60 drives the arm 52 through the intermediary of a bevel gearbox 66. An angle encoder device 67 is mounted on the arm 67 and coacts with a pick-up 68 to provide electrical signals which enable the position of the arm 52 to be measured.

Figure 4:
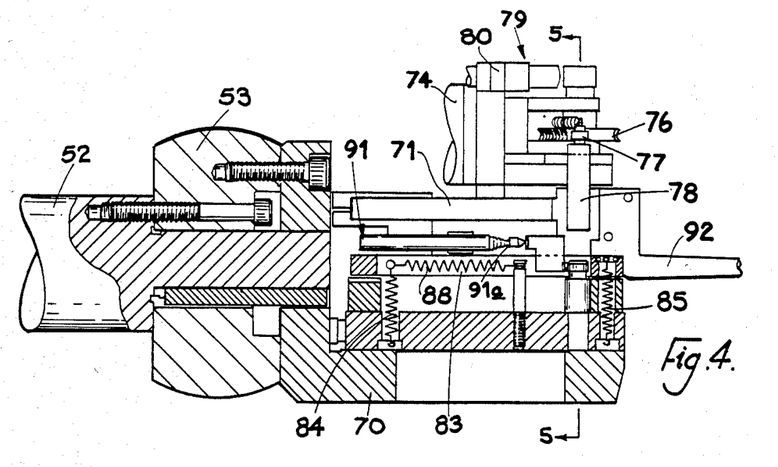
FIG. 4 is sectional view to a larger scale showing a caliper means forming a part of the instrument.

Turning now to FIGS. 5 to 10, detail is shown therein of a caliper means which is mounted on the part-spherical member 53. Such caliper means includes an L-shaped body part 70 which is secured to the spherical member 53, and, as shown in FIG. 4, keyed to the end of the arm 52 so that it rotates therewith. One contact tip mount 71 is pivotally mounted on a bracket 72 on the body part 70, the bearings which support mount 71 being shown in detail in FIG. 5. A portion of the mount 71 is engageable with the probe 73a of a linear digital transducer 73 which measures linear movement of the portion of the mount 71 in a direction perpendicular to the axis of the arm 52 and to the pivotal axis of the mount 71.

Figure 5:
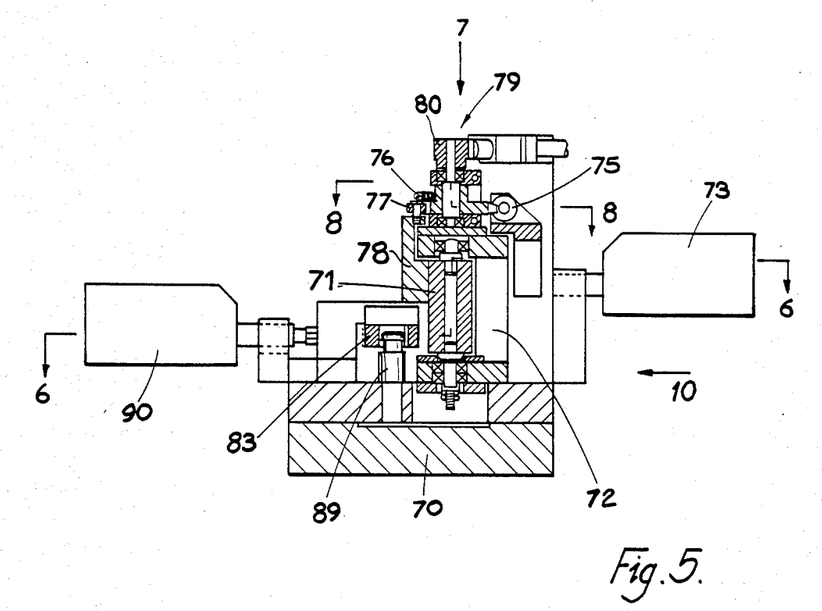
FIG. 5 is a section on line 5—5 in FIG. 4.
Figure 6:
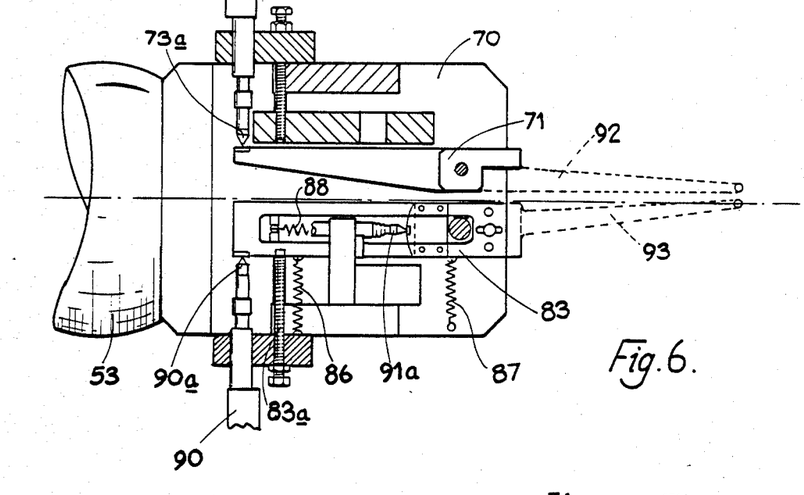
FIG. 6 is a section on line 6—6 in FIG. 5.
Figure 7:
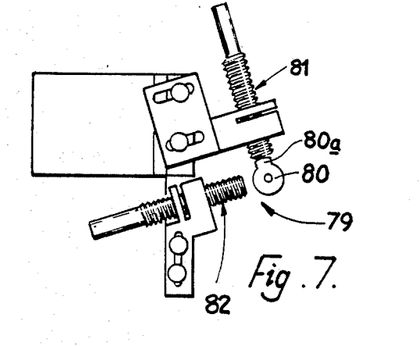
FIG. 7 is a fragmentary plan in the direction of arrow "7" in FIG. 5.
Figure 8:
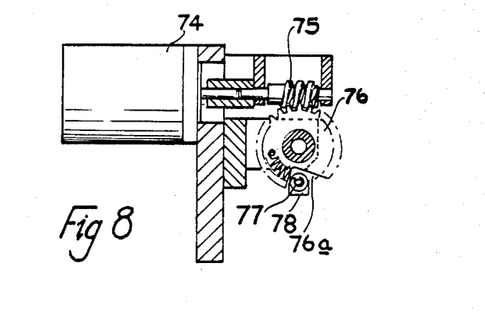
FIG. 8 is a fragmentary section on line 8—8 in FIG. 5.

The mount 71 is angularly movable about its pivotal axis by means of a stepper motor 74 the shaft of which drives a worm 75 meshed with a wormwheel 76 mounted on bracket 72 so as to be angularly movable on the same axis as the mount 71, but running in independent bearings as shown in FIG. 5. The periphery of the wormwheel 76 is formed with a notch 76a (see FIG. 8) in which there is disposed a roller which is carried on the end of a finger 78 on the mount 71, so as to provide a driving connection between the wormwheel 76 and the mount 71. There is sufficient clearance between the roller 77 and the wormwheel 76 to allow movement of the mount 71 during an actual measuring operation. A spring 78a acts between the finger 78 and the wormwheel 76 to urge mount 71 in a clockwise direction as viewed in FIG. 6.

A position detector device 79 is provided to determine whether the wormwheel 76 is in a measuring position or in a retracted position. This device includes a member 80 on the shaft of wormwheel 76, member 80 having a lobe 80a (see FIG. 7) and two proximity detectors 81 and 82 mounted to detect the proximity of the lobe 80a and providing electrical signals accordingly (these proximity detectors are omitted from FIG. 11 since they provide only logic signals as distinct from measurement signals.

A second contact mount 83 is provided and this is held in position by tension springs 84 and 85 (FIG. 4) which pull the mount 83 in a direction parallel to the axis of the first mount 71, tension springs 86 and 87 (FIG. 6) which pull the mount 83 in a direction parallel to the axis of the probe 73a, and a further tension spring 88 which pulls the mount 83 in a direction parallel to the axis of the arm 52. A post 89 mounted on the body 70 is spaced from and parallel to the axis of the first mount 71 and the springs 86, 87 and 88 serve to pull the mount 83 into contact with this post so that the mount 83 can turn about the axis of the post 89. Spring 86 also urges the mount 83 in a counter clockwise direction as viewed in FIG. 6 into contact with a stop 83a on the caliper body. The mount 83 is also free to be displaced bodily in the direction of the axis of the arm 52 against the pull applied by the spring 88. A digital linear transducer 90 with a probe 90a contacting a pad on the mount 83, provides an electrical signal representing the position of the mount 83 in the same direction as that of the transducer 73. The transducers 73, 90 thus provide two digital electrical signals from which the separation of the contact tips of two caliper elements 92, 93 mounted on the mounts 71, 83 can be calculated. A further digital linear transducer 91 with its probe 91a parallel to the axis of the arm 52 provides an electrical signal dependent on the displacement of the mount 83 in this direction.

Figure 9A:
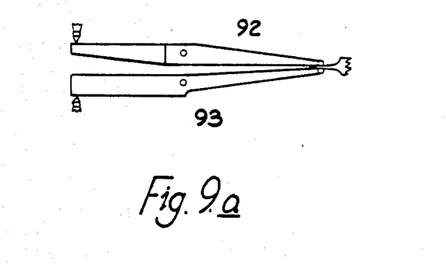
FIGS. 9a and 9b are fragmentary diagrammatic views showing the caliper means in positions for making two different types of measurement.
Figure 9B:
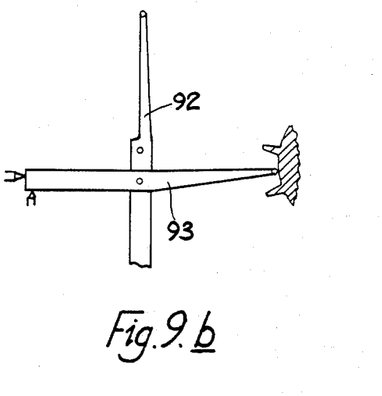
Figure 10:
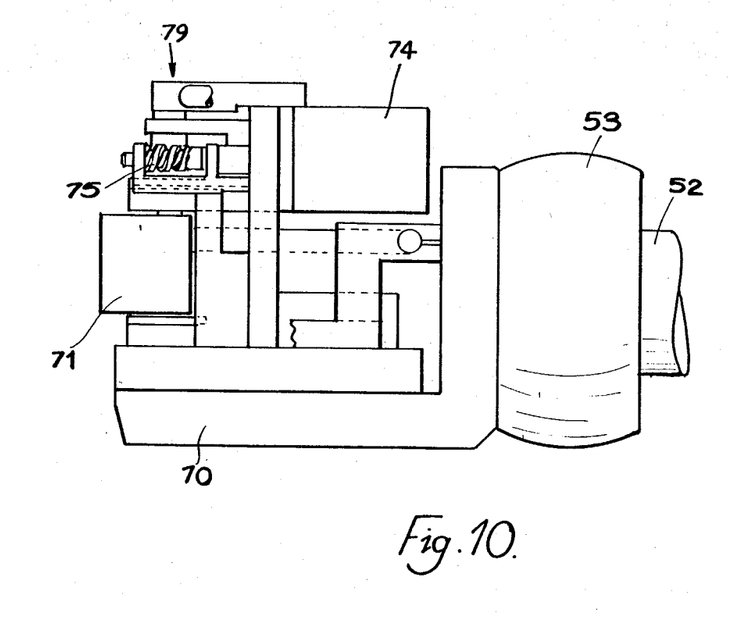
FIG. 10 is an elevation in the direction of arrow "10" in FIG. 5.

FIGS. 9a and 9b show the caliper elements 92, 93 in a thickness measuring position and a radial position measuring position respectively. In the first mentioned position the contact tips are opened against their spring loading as the caliper means is advanced towards the workpiece under test by actual contact with the workpiece. In the latter position, the caliper 92 is swung clear and caliper 93 alone is used to measure the radial position of a point on the workpiece surface using the transducer 91. The springs 86 and 78a urge the contact tip towards one another, the springs being chosen to ensure that in a rest position mount 83 abuts stop 83a with the two contact tips abutting each other and the centre of the tip of caliper element 93 lies on the axis of the arm 52.

The signals from all the transducers are applied to a central computer 100, which will not be described in detail herein, but which is programmed to control the various movements of the instrument to bring the caliper means to a series of precisely predetermined positions and to compare the measurement information received with stored data, so that the workpiece can be approved or not as the case may be.

It will be noted that where, as in the case of a compressor disc, the profiles being measured are of complex form, rotation of the arm 52 about its longitudinal axis whilst the caliper tips are in contact with opposite faces of a blade or the like, will result in the separation caliper tips varying with the angle of rotation. The thickness of the blade at any given point is actually determined by the minimum spacing of the caliper tips, and during setting up of the instrument to measure a particular component the appropriate angular position of the arm 51 can be determined by the setter by varying the angle to find that at which the spacing of the caliper tips is at a minimum.

I claim:

1. A component measuring instrument comprising a base, a carriage mounted for movement on the base along a first axis, an are mounted on said carriage for angular movement relative thereto about a point on the carriage, a cradle supporting the arm at a position spaced from said point, means supporting the cradle on the carriage for movement along second and third axes which are perpendicular to one another and to said first axis, whereby a free end of the arm is movable to any point on an imaginary part spherical surface with its centre at said point, first measuring means for measuring the position of the carriage relative to the base in the direction of the first axis, second and third measuring means for measuring the position of the cradle relative to the carriage in the direction of said second and third axes respectively, caliper means mounted on the free end of the arm and having a pair of contact tips which are urged together along predictable locii passing through and substantially normal to the centre line of said arm, to a predetermined rest position relative to the arm, means for turning said caliper means about a fourth axis extending through said point and through said centre line of said arm, and fourth measuring means on the caliper means for measuring the position of each of said contact tips, whereby a measurement of a component can be made using said caliper means at any position within a range of positions determined by the ranges of movement of said carriage and said cradle.

2. An instrument as claimed in claim 1 in which the arm has a part-spherical surface thereon and the carriage is provided with a three point support means on which said part-spherical surface rests.

3. An instrument as claimed in claim 2, in which said cradle comprises a pair of surfaces and said arm has a further part spherical surface resting on said pair of surfaces.

4. An instrument as claimed in claim 3 in which said pair of surfaces are cylinders mounted in spaced parallel relation parallel to the first axis on a compound slide structure which provides the facility for the cradle to be moved relative to the carriage along said second and third axes.

5. An instrument as claimed in claim 3 or claim 4 wherein the centres of the part spherical surface and the further part spherical surface lie on said fourth axis and means are provided for turning the whole arm about said fourth axis whereby turning of said caliper means about the fourth axis is achieved.

6. An instrument as claimed in claim 5 in which said means for turning the whole arm comprises a gymbal device mounted on said carriage, with its centre coincident with the centre of said first spherical surface, a motor mounted on the gymbal device so as to be movable with the arm when said cradle is moved in the directions of said second and third axes, and drive means connecting the motor to the arm for turning the latter about said fourth axis.

7. An instrument as claimed in claim 1 in which there is provided correction measurement means tor measuring displacements of the carriage relative to the base in the direction of said second and third axes.

8. An instrument as claimed in claim 7 in which said correction measurement means comprises a pair of spaced bars mounted on said base so as to be accurately parallel with said first axis and a plurality of transducers mounted on the carriage acting to measure the positions of different parts of the carriage relative to the bars.

9. An instrument as claimed in claim 7 or claim 8 in which a compound slide structure is provided for supporting the cradle on the carraige, said compound slide structure comprising a first slide movable relative to the carriage in the direction of said second axis, and a second slide movable relative to the first slide in the direction of said third axis, and further correction measurement means are provided for measuring displacements of the first slide relative to the carriage in the direction of said third axis and of the second slide relative to the first slide in the direction of the second axis.

10. An instrument as claimed in claim 9 in which said further correction measurement means comprises a first further bar mounted on the carriage so as to be accurately parallel with said second axis, a first spaced pair of further transducers on the first slide acting to measure the positions of two different parts of the first slide relative to the first further bar, a second further bar mounted on the first slide so as to be accurately parallel with said third axis, and a second spaced pair of further transducers on the second slide acting to measure the positions of two different parts of the second slide relative to the second further bar.

11. An instrument as claimed in claim 1 in which one contact tip of said caliper means is arranged to be swung to a non-operative position, the other contact tip is mounted for linear movement in a direction parallel to said fourth axis as well as for angular movement as a caliper, and a further measuring device is provided for measuring such linear movement of said other caliper tip.

12. An instrument as claimed in claim 11 in which said caliper means comprises a frrst contact tip mount on which said one contact tip is mounted, said first mount being pivotally mounted on said body, and means for angularly moving said first mount between operative and non-operative positions.

13. An instrument as claimed in claim 12 in which said caliper means further comprises a post on said caliper body extending parallel to the pivot axis of said first mount, and a second contact tip mount, on which said other contact tip is mounted, supported on said body and spring means urging said second mount into engagement with said post so that the second mount is pivotally movable about said post and slidable on the body in the direction of said fourth axis.

* * * * *